(12) United States Patent
Aremu et al.

(10) Patent No.: US 10,234,856 B2
(45) Date of Patent: Mar. 19, 2019

(54) SYSTEM AND METHOD FOR CONTROLLING A MACHINE

(71) Applicant: Caterpillar Inc., Peoria, IL (US)

(72) Inventors: Oluseun Aremu, Brooklyn Park, MN (US); Michael Schilling, Pittsburgh, PA (US)

(73) Assignee: Caterpillar Inc., Deerfield, IL (US)

( * ) Notice: Subject to any disclaimer, the term of this patent is extended or adjusted under 35 U.S.C. 154(b) by 342 days.

(21) Appl. No.: 15/153,304

(22) Filed: May 12, 2016

(65) Prior Publication Data
US 2017/0329304 A1   Nov. 16, 2017

(51) Int. Cl.
G05B 19/408 (2006.01)
G05D 1/00 (2006.01)
G05D 1/02 (2006.01)

(52) U.S. Cl.
CPC ............. *G05D 1/00* (2013.01); *G05D 1/0274* (2013.01); *G05D 1/0297* (2013.01); *G05D 2201/0202* (2013.01)

(58) Field of Classification Search
CPC .............. G05B 19/408; G05B 19/4063; G05B 2219/36046; G05D 1/0088; G05D 1/0274; G05D 1/0251; G05D 1/0291; G05D 1/0297; G05D 1/0212; G05D 1/0221; G01S 17/936; G01S 17/89; G01S 5/0257; G01S 5/0263; G01S 5/0268; G06K 9/00791; G06K 9/00805
USPC ........... 701/23, 24, 25, 28, 50; 340/435, 436
See application file for complete search history.

(56) References Cited

U.S. PATENT DOCUMENTS

| | | | |
|---|---|---|---|
| 6,608,913 B1 | 8/2003 | Hinton et al. | |
| 7,984,184 B2 | 7/2011 | Woon et al. | |
| 8,090,194 B2* | 1/2012 | Golrdon | G01B 11/2513 |
| | | | 382/154 |
| 8,351,684 B2 | 1/2013 | Clar et al. | |
| 8,364,189 B2* | 1/2013 | Mintah | H04L 45/04 |
| | | | 370/310 |
| 8,437,901 B2* | 5/2013 | Anderson | G05D 1/0088 |
| | | | 340/435 |
| 8,515,654 B2 | 8/2013 | Turner et al. | |
| 8,560,145 B2* | 10/2013 | Anderson | G06N 5/043 |
| | | | 701/1 |
| 8,639,420 B2* | 1/2014 | Corcoran | G06Q 10/063 |
| | | | 404/117 |
| 8,730,233 B2 | 5/2014 | McDaniel et al. | |
| 8,788,496 B2 | 7/2014 | Darby, Jr. et al. | |
| 8,818,567 B2* | 8/2014 | Anderson | G05D 1/0088 |
| | | | 701/2 |
| 8,886,387 B1* | 11/2014 | Agarwal | G05D 1/0253 |
| | | | 701/28 |

(Continued)

*Primary Examiner* — Richard A Goldman
(74) *Attorney, Agent, or Firm* — L. Glenn Waterfield; Leydig, Voit & Mayer, Ltd.

(57) ABSTRACT

A system for communicating between a machine and a remote system generates machine data and image data on-board the machine. The data is segmented into machine data subsets and image data subsets. At least some of the machine data subsets and only some of the image data subsets are transmitted off-board the machine to an off-board controller. The off-board controller updates an electronic map based upon the image data subsets, and generates a machine movement plan based upon the updated electronic map.

20 Claims, 7 Drawing Sheets

(56) References Cited

U.S. PATENT DOCUMENTS

| | | | | |
|---|---|---|---|---|
| 8,924,152 B2* | 12/2014 | Hunt | | G06Q 10/00 172/134 |
| 8,989,972 B2* | 3/2015 | Anderson | | A61B 5/6804 701/301 |
| 9,008,890 B1* | 4/2015 | Herbach | | B60W 30/00 340/435 |
| 9,014,903 B1* | 4/2015 | Zhu | | G01C 21/3446 382/103 |
| 9,026,315 B2* | 5/2015 | Anderson | | G05D 1/0274 701/23 |
| 9,097,520 B2 | 8/2015 | Stratton et al. | | |
| 9,097,800 B1* | 8/2015 | Zhu | | G01S 13/865 |
| 9,235,214 B2* | 1/2016 | Anderson | | G05D 1/0221 |
| 9,383,753 B1* | 7/2016 | Templeton | | G05D 1/0246 |
| 9,469,967 B2* | 10/2016 | Edara | | E02F 9/2029 |
| 9,510,137 B2* | 11/2016 | McCoy | | H04L 67/104 |
| 9,527,211 B2* | 12/2016 | Posselius | | G05D 1/0295 |
| 9,880,075 B2* | 1/2018 | Finch | | G01M 17/03 |
| 9,916,703 B2* | 3/2018 | Levinson | | G07C 5/0808 |
| 9,919,232 B2* | 3/2018 | Tappeiner | | A63F 13/00 |
| 9,946,264 B2* | 4/2018 | Liao | | G06T 7/55 |
| 9,983,590 B2* | 5/2018 | Templeton | | G05D 1/0231 |
| 2009/0021514 A1 | 1/2009 | Klusza | | |
| 2011/0087662 A1* | 4/2011 | Darby, Jr. | | G06Q 10/06 707/736 |
| 2012/0197439 A1* | 8/2012 | Wang | | B25J 9/1689 700/259 |
| 2013/0243250 A1 | 9/2013 | France et al. | | |
| 2014/0018994 A1* | 1/2014 | Panzarella | | G05D 1/0212 701/25 |
| 2014/0233010 A1* | 8/2014 | Baldwin | | G01C 21/30 356/4.01 |
| 2014/0300775 A1* | 10/2014 | Fan | | H04N 5/23229 348/231.3 |
| 2014/0316837 A1 | 10/2014 | Fosburgh et al. | | |
| 2014/0342834 A1* | 11/2014 | Tappeiner | | A63H 30/04 463/42 |
| 2015/0094089 A1* | 4/2015 | Moeglein | | H04W 4/029 455/456.1 |
| 2015/0106139 A1 | 4/2015 | Jones et al. | | |
| 2015/0163993 A1* | 6/2015 | Pettersson | | A01D 34/008 701/28 |
| 2016/0188977 A1* | 6/2016 | Kearns | | G06K 9/00664 348/113 |
| 2016/0312446 A1* | 10/2016 | Pettersson | | E02F 9/262 |
| 2017/0046840 A1* | 2/2017 | Chen | | G06T 7/0028 |
| 2017/0123422 A1* | 5/2017 | Kentley | | G05D 1/0088 |
| 2017/0212529 A1* | 7/2017 | Kumar | | G05D 1/102 |
| 2017/0255199 A1* | 9/2017 | Boehmke | | G05D 1/024 |
| 2017/0262709 A1* | 9/2017 | Wellington | | G06K 9/00791 |
| 2017/0277197 A1* | 9/2017 | Liao | | G05D 1/0251 |
| 2017/0316333 A1* | 11/2017 | Levinson | | G06N 99/005 |
| 2017/0329304 A1* | 11/2017 | Aremu | | G05B 19/408 |
| 2017/0351261 A1* | 12/2017 | Levinson | | G05D 1/0291 |
| 2018/0040163 A1* | 2/2018 | Donnelly | | G06T 19/006 |
| 2018/0071918 A1* | 3/2018 | Angle | | B25J 13/006 |
| 2018/0075302 A1* | 3/2018 | Udell | | G06K 9/00671 |
| 2018/0116105 A1* | 5/2018 | Balutis | | A01D 34/008 |
| 2018/0136644 A1* | 5/2018 | Levinson | | G06N 99/005 |
| 2018/0143324 A1* | 5/2018 | Keilaf | | G01S 17/936 |
| 2018/0144458 A1* | 5/2018 | Xu | | G06T 7/004 |

* cited by examiner

SYSTEM AND METHOD FOR CONTROLLING A MACHINE

TECHNICAL FIELD

This disclosure relates generally to work site perception systems, and more particularly, to a system that directly shares perception information between adjacent machines.

BACKGROUND

Movable machines such as dozers, rotary drills, haul trucks, motor graders, excavators, wheel loaders, and other types of equipment are used to perform a variety of tasks. For example, these machines may be used to move material or objects, alter the ground or work surfaces, or perform other functions at a work site. The machines may perform operations such as carrying, drilling, digging, loosening, etc., different materials at the work site.

Machines may be equipped with a perception system for mapping, detecting, and/identifying the working environment and obstacles at the work site. Machines may also include a plurality of sensors for monitoring the performance of the machines. While data generated by one machine may be useful to analyze the machine's performance and plan the performance of other machines, the amount of data generated may be too large to permit the real time use of the data. The operating environments of such machines may limit the amount and speed of data transmission and thus prevent or limit the real time use of such data. Even though data processing and transmission capabilities may likely increase in the future, it is also likely that systems may see similar or greater increases in the amount of data generated.

U.S. Patent Publication No. 2015/0106139 discloses a reporting system associated with a work site management system. The data may include machine information, work site information, personnel information or a combination. An extraction and transformation module is configured to perform various processing steps on the source data in order to derive results therefrom and store derived results obtained from the sources into a target database coupled to the extraction and transformation module. The derived results may be retrieved and accessed by a reporting module.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for communicating between a machine and a remote system, includes an off-board controller associated with the remote system off-board the machine, a position sensor on-board the machine for generating position signals indicative of a pose of the machine, a plurality of machine sensors on-board the machine for generating machine signals indicative of a plurality of machine characteristics of the machine, and a perception sensor movably associated with the machine for generating raw data points reflective of a perceived work environment associated with the machine. A controller is configured to determine the pose of the machine based upon the position signals, determine a plurality of machine characteristic of the machine based upon the machine signals, associate the pose of the machine with the plurality of machine characteristics, generate a relative point cloud of the perceived work environment associated with the machine based upon the raw data points, and determine an absolute point cloud based upon the relative point cloud and the pose of the machine. The controller is further configured to segment the plurality of machine characteristics to define a plurality of machine data subsets, segment the absolute point cloud to define a plurality of image data subsets, and transmit at least some of the plurality of machine data subsets and only some of the plurality of image data subsets off-board the machine to the off-board controller. The off-board controller is configured to store an electronic map of a portion of a work site, update the electronic map based upon the image data subsets, and generate a machine movement plan based upon the updated electronic map.

In another aspect, a method of communicating between a machine and a remote system includes determining a pose of the machine based upon position signals from a position sensor on-board the machine, determining a plurality of machine characteristic of the machine based upon machine signals from a plurality of machine sensors on-board the machine, and associating the pose of the machine with the plurality of machine characteristics. The method further includes generating a relative point cloud of the perceived work environment associated with the machine based upon the raw data points from a perception sensor movably associated with the machine, determining an absolute point cloud based upon the relative point cloud and the pose of the machine, segmenting the plurality of machine characteristics to define a plurality of machine data subsets, segmenting the absolute point cloud to define a plurality of image data subsets, and transmitting at least some of the plurality of machine data subsets and only some of the plurality of image data subsets off-board the machine to the off-board controller. Still further, the method includes storing an electronic map of a portion of a work site off-board the machine, updating the electronic map based upon the image data subsets, and generating off-board the machine a machine movement plan based upon the updated electronic map.

In still another aspect, a system for communicating between a machine and a remote system, includes an off-board controller and a machine, the off-board controller is associated with the remote system off-board the machine. The machine includes a ground engaging drive mechanism to propel the machine, a position sensor for generating position signals indicative of a pose of the machine, a plurality of machine sensors for generating machine signals indicative of a plurality of machine characteristics of the machine, and a perception sensor movably associated with the machine for generating raw data points reflective of a perceived work environment associated with the machine. A controller is configured to determine the pose of the machine based upon the position signals, determine a plurality of machine characteristic of the machine based upon the machine signals, associate the pose of the machine with the plurality of machine characteristics, generate a relative point cloud of the perceived work environment associated with the machine based upon the raw data points, and determine an absolute point cloud based upon the relative point cloud and the pose of the machine. The controller is further configured to segment the plurality of machine characteristics to define a plurality of machine data subsets, segment the absolute point cloud to define a plurality of image data subsets, and transmit at least some of the plurality of machine data subsets and only some of the plurality of image data subsets off-board the machine to the off-board controller. The off-board controller is configured to store an electronic map of a portion of a work site, update the electronic map based upon the image data subsets, and generate a machine movement plan based upon the updated electronic map.

DETAILED DESCRIPTION

Figure 1:
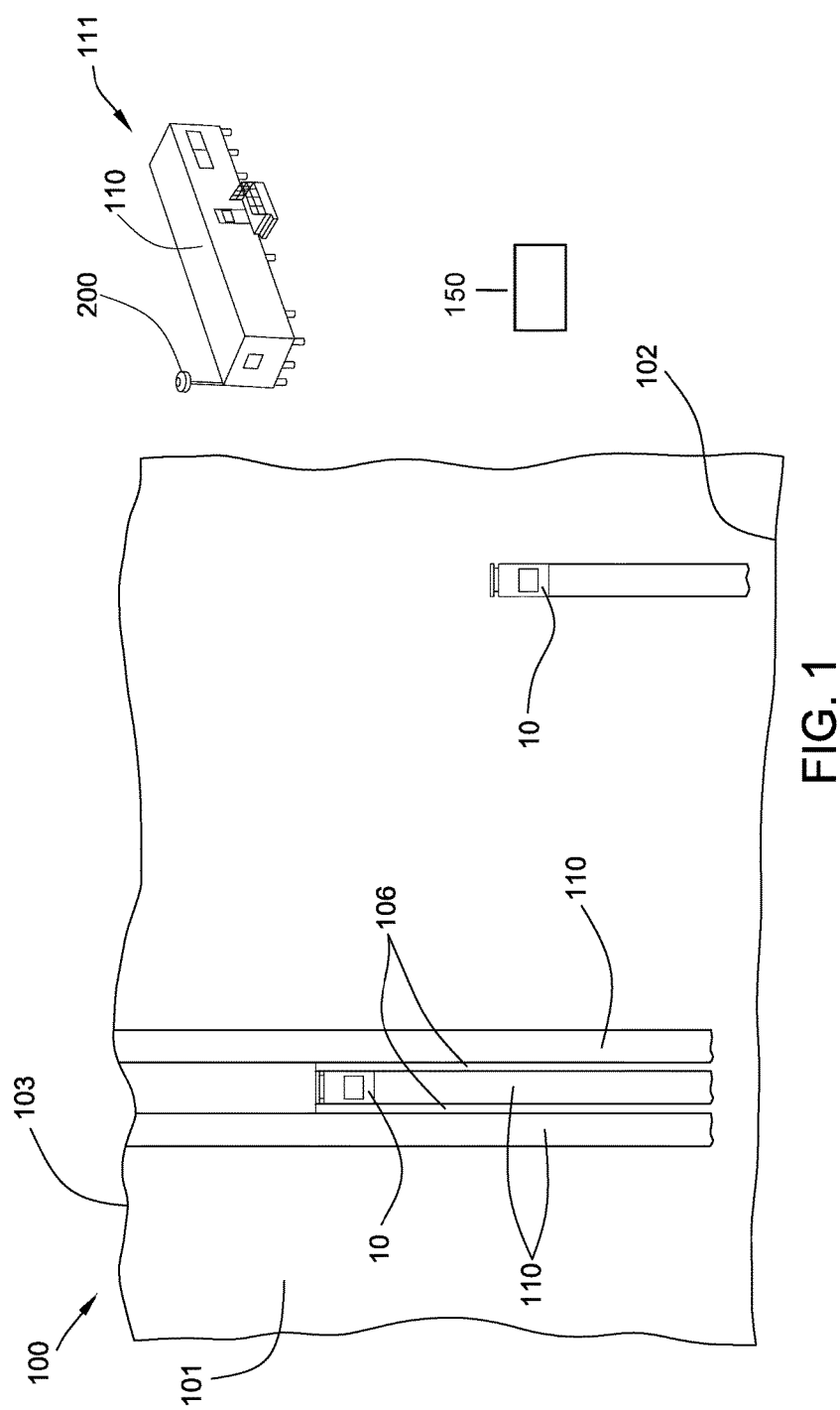
FIG. 1 is a schematic view of a work site at which a system incorporating the principles disclosed herein may be used.

FIG. 1 illustrates an exemplary work site 100 with machines 10 operating at the work site. Work site 100 may include, for example, a mine site, a landfill, a quarry, a construction site, a road work site, or any other type of work site. Machines 10 may perform any of a plurality of desired operations or tasks at work site 100, and such operations or tasks may require the machine to generally traverse work site 100. Any number of machines 10 may simultaneously and cooperatively operate at work site 100, as desired. As depicted in FIG. 1, two machines 10 are depicted as dozers but may embody any type of machine including excavators, haul trucks, rotary drill machines, and any other machine capable of moving about a work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103.

Machines 10 may be configured to be operated autonomously, semi-autonomously, or manually. When operating semi-autonomously or manually, machine 10 may be operated by remote control and/or by an operator physically located within a cab 24 of the machine. As used herein, a machine 10 operating in an autonomous manner operates automatically based upon information received from various sensors without the need for human operator input. A machine 10 operating semi-autonomously includes an operator, either within the machine or remotely, who performs some tasks or provides some input and other tasks are performed automatically and may be based upon information received from various sensors. A machine 10 being operated manually is one in which an operator is controlling all or essentially all of the functions of the machine. A machine 10 may be operated remotely by an operator (i.e., remote control) in either a manual or a semi-autonomous manner.

Figure 2:
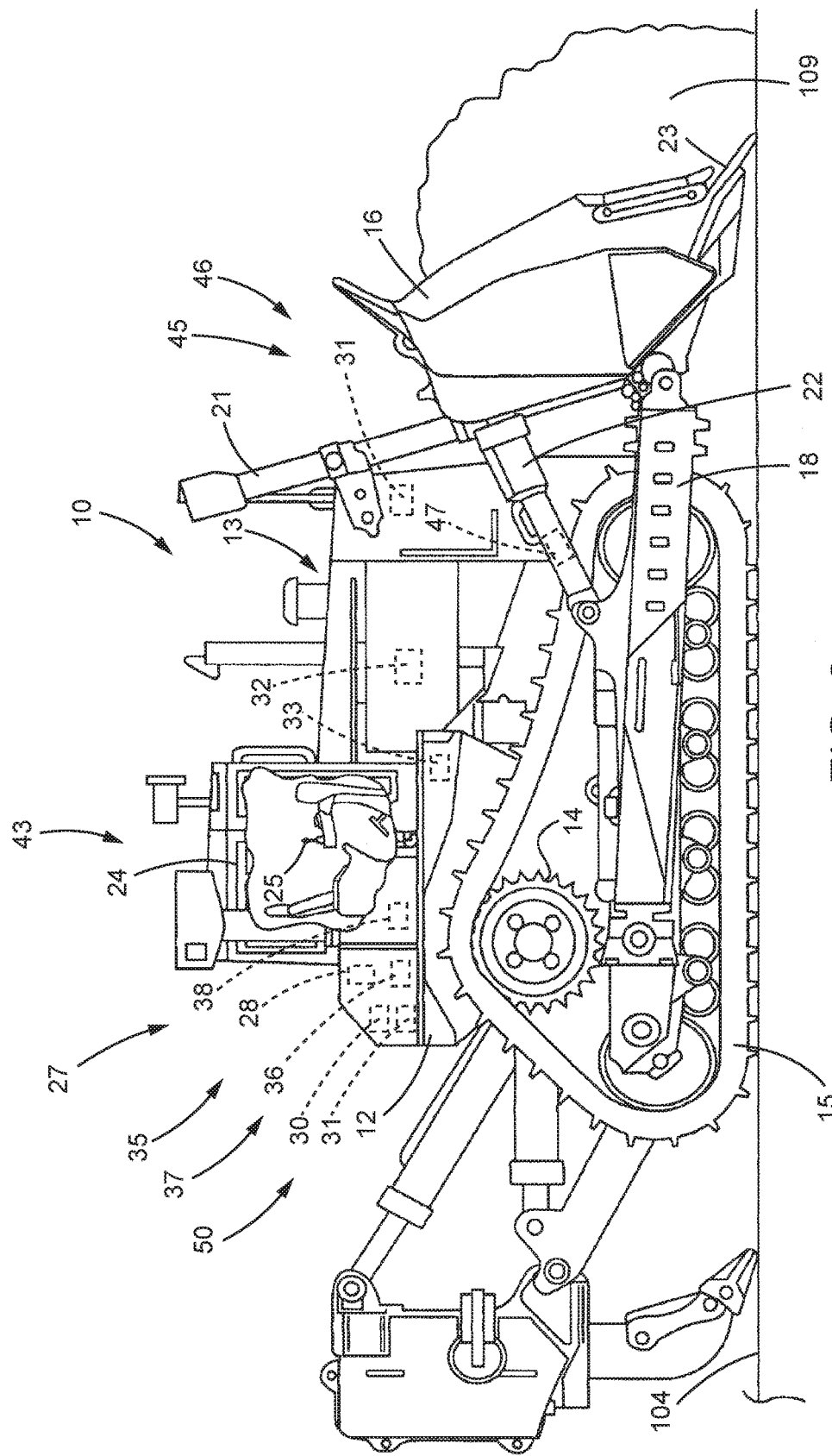
FIG. 2 is a diagrammatic view of a machine in accordance with the disclosure.

FIG. 2 depicts a diagrammatic illustration of a machine 10 such as a dozer with a ground engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Operation of the engine 13 and a transmission (not shown), which are operatively connected to the drive sprockets 14 and tracks 15, may be controlled by a control system 35 including a controller 36.

Blade 16 may be pivotably connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 40. The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and controller 36 may be located on the machine 10 as an on-board control system 37, as shown generally by an arrow in FIG. 2 indicating association with the machine, with an on-board controller 38, or may be distributed with components such as an off-board controller 111 also located remotely from or off-board the machine such as at a command center 110 (FIG. 1) located on-site or off-site. The functionality of control system 35 may be distributed so that certain functions are performed at machine 10 and other functions are performed remotely.

Figure 3:
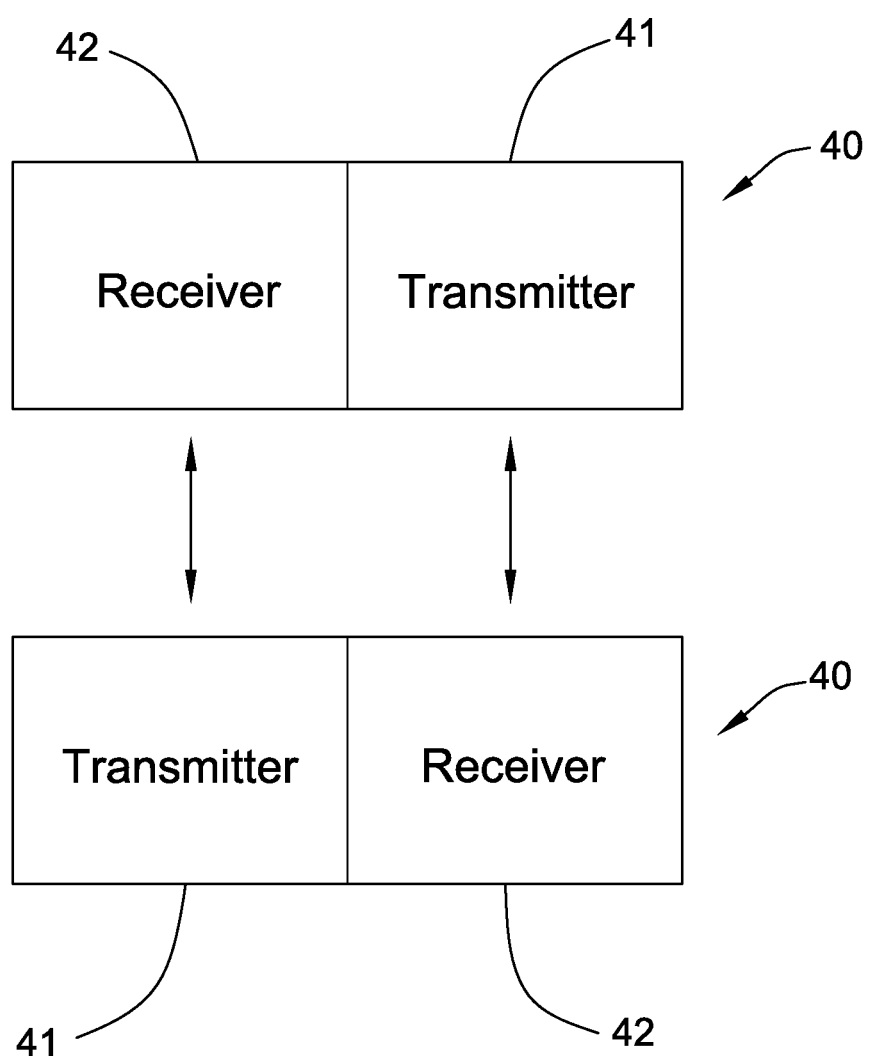
FIG. 3 is a schematic view of a wireless communications system.

Each of machine 10 and the command center 110 may include a wireless communications system 40 to permit wireless transmission of a plurality of instructions and information between the machines 10 and the command center 110 as well as permit communication with other machines and systems. In one embodiment depicted in FIG. 3, each wireless communications system 40 may include a transmitter 41 for transmitting signals from one wireless communications system and a receiver 42 for receiving signals from a transmitter system of another wireless communications system. In some instances, the transmitter 41 and the receiver 42 may be combined as a transceiver system. Commands or instructions to operate the machine 10 may be generated at the command center 110 and transmitted to the machine and utilized by the on-board controller 38 to operate the machine.

The wireless communications system 40 may implement or utilize any desired system or protocol including any of a plurality of communications standards. The desired protocols will permit communication between the machine 10 and the remote system, as well as between the machine 10 and other desired machines or systems. Examples of wireless communications systems or protocols that may be used include a wireless personal area network such as Bluetooth® (e.g., IEEE 802.15) or another personal area network or a local area network such as IEEE 802.11b, 802.11g, 802.11p, a cellular network, or any other system or protocol for data transfer.

Referring back to FIG. 2, machine 10 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the pose of the machine. The position sensor 28 may include a plurality of individual sensors that cooperate to generate and provide position signals to controller 36 indicative of the position and orientation of the machine 10.

In one example, the position sensor 28 may include one or more sensors that interact with a positioning system such as a global navigation satellite system or a global positioning system to operate as a position sensor. In another example, the position sensor 28 may further include an inertial measurement unit and/or a slope or inclination sensor such as pitch angle sensor for measuring the slope or inclination of the machine 10 relative to a ground or earth reference. The controller 36 may use position signals from the position sensor 28 to determine the position of the machine 10 within work site 100. In other examples, the position sensor 28 may include other localization systems such as lasers, sonar, radar, cameras, or other systems to determine all or some aspects of the position of machine 10 relative to a known datum or reference.

Additional sensors may be provided that generate machine signals indicative of machine characteristics of the machine 10. Such machine sensors may include pitch rate sensor 29 (e.g., a gyroscope), acceleration sensor 30 (e.g., a 3-axis accelerometer), a slope or inclination sensor such as a pitch angle sensor 31, engine speed sensor 32, and track speed sensor 33. The control system 35 may include an implement load monitoring system 45 shown generally by an arrow in FIG. 2. The implement load monitoring system 45 may include a variety of different types of implement load sensors depicted generally by an arrow in FIG. 2 as an implement load sensor system 46 to measure the load on the blade 16. The load on the blade 16 may be used to determine an estimate of an amount of material being moved by the blade. In one embodiment, the implement load sensor system 46 may embody one or more pressure sensors 47 for use with one or more hydraulic cylinders, such as second hydraulic cylinders 22, associated with blade 16. Signals from the pressure sensor 47 indicative of the pressure within the second hydraulic cylinders 22 may be monitored by controller 36. The load on the blade 16 may be correlated to the load on the engine 13 by controller 36.

Figure 4:
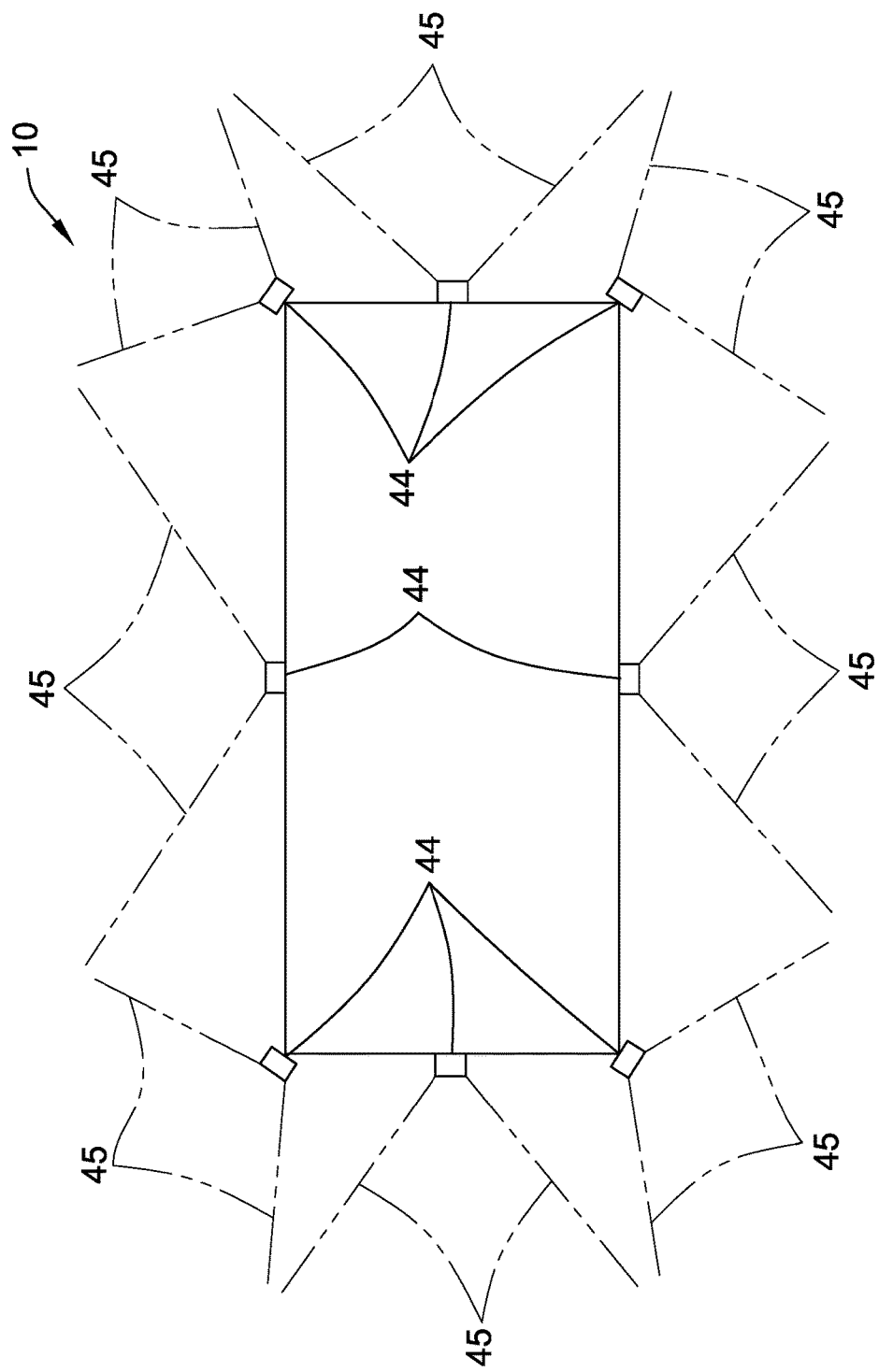
FIG. 4 is a schematic top plan view of the machine of FIG. 2.

A perception system 43 may be mounted on or associated with the machine, as shown generally by an arrow in FIG. 4 indicating association with the machine. The perception system 43 may include one or more systems such as a radar system, a SONAR system, a LIDAR system, a camera vision system, and/or any other desired system that operate with associated perception sensors 44. Perception sensors 44 may generate data that is received by the controller 36 and used by the controller to determine the position of the work surface and the presence and position of obstacles within the range of the sensors. The field of view of each perception sensor 44 is depicted schematically in FIG. 4 by reference number 45.

The perception system 43 may be used to generate an electronic map and/or images of the environment around machine 10. The perception system 43 may use the plurality of perception sensors 44 mounted on the machine 10 to generate perception data from a plurality of points of view relative to the machine 10. Each perception sensor 44 may be mounted on the machine 10 at a relatively high vantage point. As depicted schematically in FIG. 4, eight perception sensors 44 are provided that record or sense images in the forward and rearward directions as well as to each side of machine 10. The perception sensor 44 may be positioned in other locations as desired. Controller 36 may receive perception data from the perception sensors 44 and, in some instances, generate video and/or still images based upon such perception data.

In another embodiment, the perception system 43 may include a plurality of perception sensors 44 movably associated with the machine 10 such as sensors mounted on a mobile machine or device including a drone or unmanned aerial vehicle 150. Data from the perception sensors 44 may be transmitted to the machine 10 or another system remote from the machine wirelessly or in a wired manner. In one embodiment, an unmanned aerial vehicle 150 having perception sensors 44 may be tethered (physically or virtually) to the machine 10 to provide perception data to the machine along a wired or wireless connection.

Figure 5:
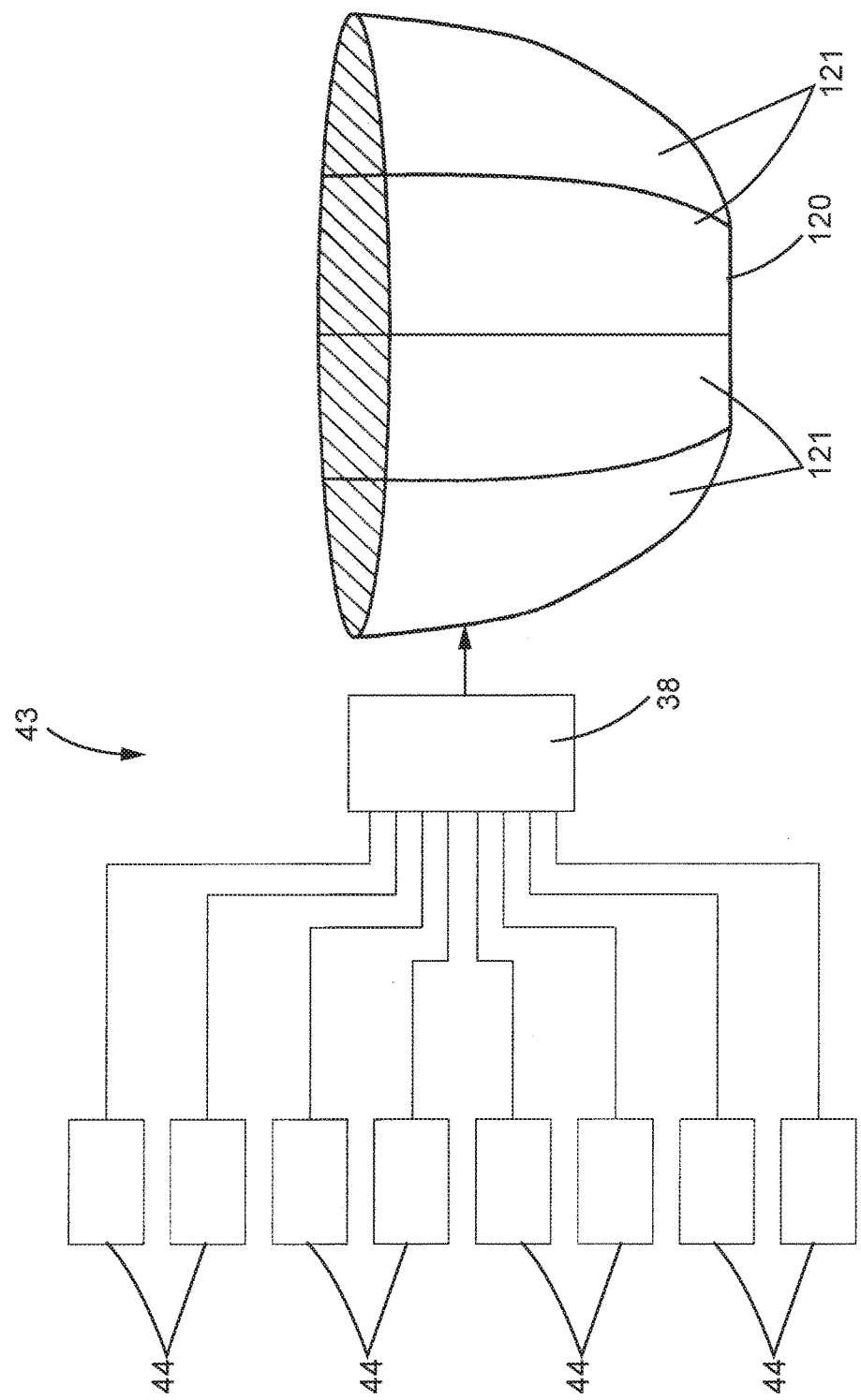
FIG. 5 is a schematic view of a perception system generating an unified image in accordance with the disclosure.

In some embodiments, controller 36 may combine the raw data points or image data captured by the perception sensors 44 into a unified image 120 (FIG. 5) of a portion of the work site 100 adjacent and surrounding the machine 10. FIG. 5 is a pictorial illustration of one example of controller 36 combining image data from each of the perception sensors 44 to generate the unified image 120 of the perceived work environment associated with the machine 10. The unified image 120 may represent all image data available for the environment adjacent machine 10. In one example, the unified image 120 represents a 360-degree view or model of the environment of machine 10, with machine 10 at the center of the 360-degree view. According to some embodiments, the unified image 120 may be a non-rectangular shape. For example, the unified image 120 may be hemispherical and machine 10 may be conceptually located at the pole, and in the interior, of the hemisphere.

Controller 36 may generate the unified image 120 by mapping raw data points captured by the perception sensors 44 to an electronic or data map. The electronic map may be divided into sections 121, with each section corresponding to one set of raw data points. The mapping may correlate a two dimensional point from a perception sensor 44 to a three dimensional point on the map used to generate the unified image 120. For example, a raw data point of the image data located at (1, 1) may be mapped to location (500, 500, 1) of the unified image. The mapping may be accomplished using a look-up table that may be stored within controller 36. The look-up table may be configured based on the position and orientation of each perception sensor 44 on machine 10. Other methods for mapping image data may be used as desired.

The perception sensors 44 may include and/or be associated with a timing device or element (not shown) to establish or compute a time designation for each data point or signal. The time designation may be associated with or appended to each raw data point to maintain a record as to when each data point or signal was generated. The time designation may be measured relative to any desired system. In one example, the time designation may be based upon Coordinated Universal Time. In another example, the time designation may be based upon any type of time measurement system that is supported by a geographic information system ("GIS"). Accordingly, the data within the unified or electronic map may further include the time at which the data was collected.

Data for each point may be stored in any GIS coordinate or time system. In one embodiment, data may be stored the form of x, y, z, and t where x, y, and z correspond to Cartesian coordinates and t is the time of the data collection. In other embodiments, data may be stored in spherical or cylindrical coordinate systems or in any other desired manner.

In order to improve the performance of the machine 10 and/or other machines at the work site 100 in real time, it may be desirable to share data or information generated or collected by the machine with an off-machine planning system and/or other machines. However, large quantities of data may be generated and collected by the machine 10 and sharing of the data may be complicated by relatively slow wireless data transmission due to operating environment at the work site 100. Accordingly, control system 35 may include a data management system indicated generally at 50 in FIG. 2 that segments the data and sends only the most relevant data off-board the machine 10. Such segregation and prioritization permits a reduction in the amount of data that is sent wirelessly off-board the machine 10. In doing so, the data management system 50 may segment the collected data into a plurality of data subsets, determine which of the data subsets are necessary or desired to be sent off-board, and then transmits off-board only those necessary or desired data subsets. By doing so, the amount of data transmitted may be reduced, which may result in improved real time management of machines 10 operating at the work site 100.

Figure 6:
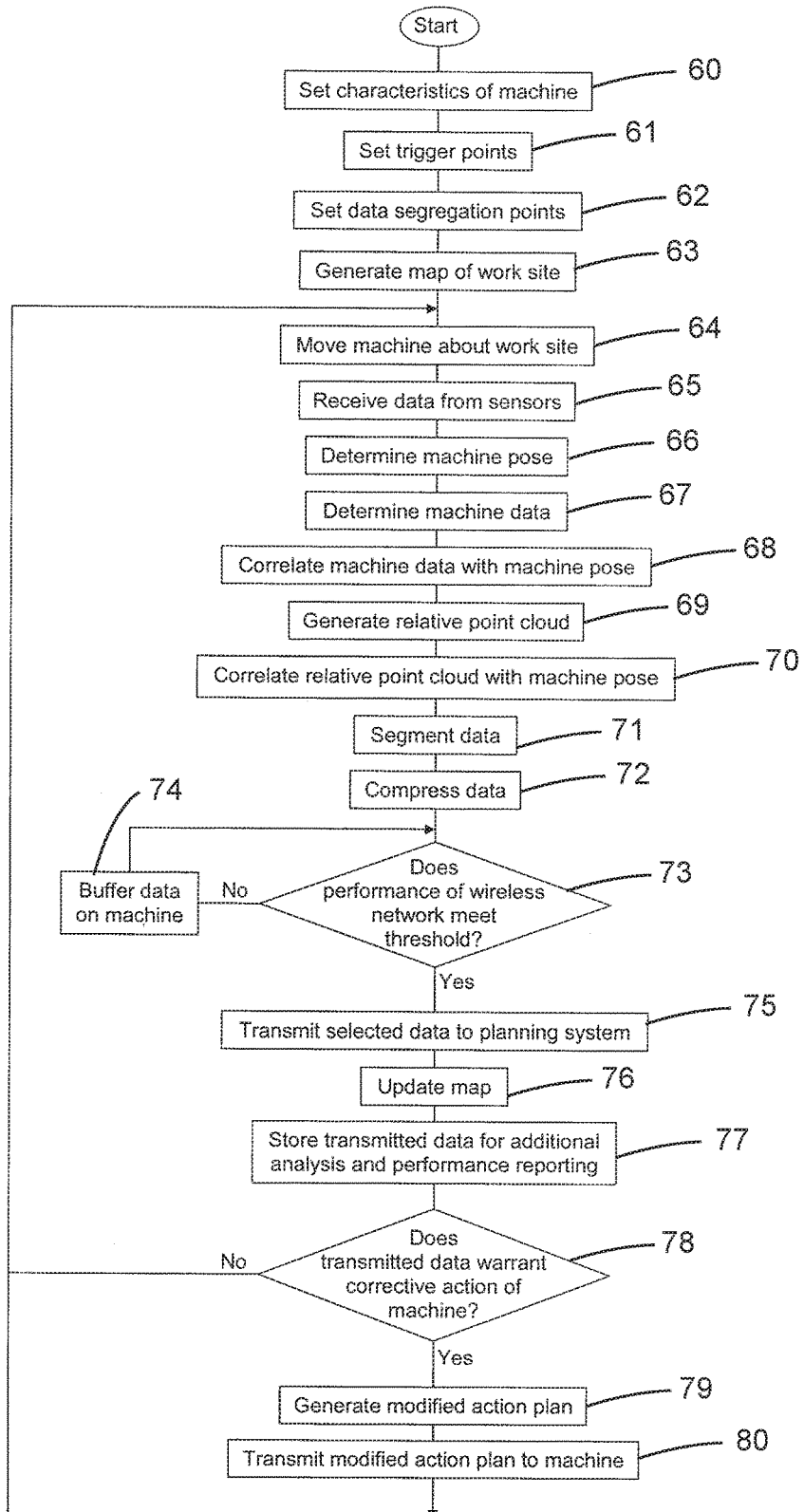
FIG. 6 is a flowchart of a process of operating a machine in accordance with the disclosure.

Referring to FIG. 6, a process for operating machine 10 at work site 100 is depicted. Initially, characteristics of the machine 10 may be set or stored within the controller 35 at stage 60. The characteristics may include, for example, data maps of the machine performance based upon data received from various sensors associated with the machine 10. Trigger points associated with or corresponding to the beginning and end of data collection operations may be set or stored within controller 35 at stage 61. The trigger points may correspond to or be based upon types or segments of operations as well as physical locations at the work site 100. Segmentation or manners in which collected data may be segmented or decimated may be set or stored within controller 35 at stage 62. The machine characteristics, the data collection trigger points, and the manner of data segmentation may be set or stored by an operator, management or other personnel, or may be pre-set prior to operating the machine 10 at the work site 100, or may be loaded from external sources. In another example, data collection trigger points in the manner of data segmentation may be preset within the controller 36 and different configurations of trigger points and data segmentation may be selected during the machine operation.

At stage 63, a map of the work site 100 may be generated. The map may be generated in any desired manner including using mapping machines (not shown) that traverse the work surface or perception sensors mounted on drones (not shown) that travel above the work surface.

At stage 64, the machine 10 may be operated at and moved about the work site 100. In doing so, the controller 35 of machine 10 may receive at stage 65 data from the sensors associated with the machine. At stage 66, the on-board controller 38 may determine the pose of the machine 10 based upon the position data from the position sensor 28.

At stage 67, machine data may be generated by the various sensors on the machine 10 (other than position sensor 28 and perception sensors 44) and received by on-board controller 38. The collected machine data may be in any form and may be used to determine or be indicative of any operation, characteristic, or feature of the machine 10. In one example, operating characteristics may be determined based upon data from sensors on the machine and stored within the on-board controller 38. Examples may include the pitch rate of the machine 10 being determined by pitch rate sensor 29, the acceleration of the machine being determined by the acceleration sensor 30, the speed of the engine 13 being determined by the engine speed sensor 32, and the load on a work implement such as blade 16 being determined by implement load sensor system 46. In some instances, the operating characteristics may be used to determine information regarding the operation of the machine 10 and/or a particular task being performed such as the operation of the engine 13, the status of a work implement such as blade 16. In addition, the machine data may also include data from the on-board control system 37 such as, for example, the status of various operating systems as well as the operating gear of the machine 10. The collected machine data may be correlated or referenced at stage 68 with the pose of the machine and the time of collection to create a data structure or database of collected machine data.

Relative image data (such as in the form of a point cloud) may be generated at stage 69 by the perception sensors 44. Pose data from the position sensor 28 may be combined with the relative image data at stage 70 to create absolute image data in the form of x, y, z where x, y, and z correspond to Cartesian coordinates. The absolute image data may further include the time at which the data was collected. In some instances, the absolute image data may also be coupled or referenced to the collected machine data.

It should be noted that the types and views of the data (i.e., machine data and absolute image data) may be generated and stored based upon different types of trigger events. In one example, data may be stored based upon input from an operator or other personnel. In another example, data may be stored based upon certain events or operations being performed by the machine 10. Using slot dozing as an example, certain data subsets may be created during the cutting phase, additional data subsets may be generated during the carrying phase, and still different data subsets may be created while the machine is operating in reverse to move back to the next cut location. The controller 36 may be configured to change the type of data subsets being stored as the type of operation changes.

The amount of collected data within the data structure may be relatively large, which may not present challenges with respect to data storage on machine 10. However, transmission of all or most of the collected data off the machine, particularly in rugged or isolated environments at which the machine 10 may be operating, may be problematic. At such locations, networks may have reduced performance resulting in slower data transmission. As a result, attempts at transmitting large amounts of data may be ineffective. This may prevent the real time inclusion of current operating data of the machine 10 and its operating environment in the process of planning future operations when the machine 10 is being operated autonomously based upon instructions sent from a remote planning system such as one located at command center 110.

In order to reduce the amount of data to be transmitted, the data management system may identify only desired or necessary data for wireless transmission to a remote location. To facilitate transmitting only the desired or necessary data, the controller 36 may segment or decimate the collected data at stage 71 into a plurality of smaller data sets or subsets such as those based upon the operation being performed, the status of the machine 10, and/or only certain aspects of the absolute image data. As stated below, only the machine data and the absolute image data specifically desired by or necessary for an off-machine system may be transmitted by the wireless transmitter 41 on-board machine 10.

In one example, machine data may be segmented or decimated into a plurality of machine data subsets according to the type of operation being performed. For example, only certain types of data or data subsets may be collected and stored while machine 10 is performing a material moving operation such as slot dozing. The data may be further segmented based upon the phases of the material moving operation. Again utilizing a slot dozing operation as an example, data may be segmented into different subsets based upon the cutting, carrying, and reversing phases of the machine operation. During each phase, the engine speed, gear, torque, and track slip may be different and thus may be collected or sampled and stored at different rates. Still further, some aspects of the data may only be relevant to certain phases. For example, implement load may be particularly relevant during the cut and carry phases but not relevant during the reversing face.

In addition, the data segmentation or decimation associated with each operation may be different depending upon the location of the machine 10. Accordingly, it may be desirable to correlate the data associated with each operation being performed together with the location of the machine. Although described in the context of slot dozing, the types of data and its segregation or decimation may also vary depending upon the type of machine, the types of operations being performed, or even the machine performing an operation.

The absolute image data may also be segmented or decimated into a plurality of image data subsets with each image data subset forming a view or a portion of the point cloud data generated by the perception system 43. For example, a different image data subset may be created for each of the position of the lower surface of each slot 105, the position of each side wall 106 of each slot, the shape of the walls or windrows between each slot, and other surfaces of the work site.

In some instances, data may only be collected from some of the sensors. In other instances, data may only be processed or stored from some of the sensors. In still other instances, data may be generated and stored from all of the sensors. Regardless of the source of the data and the amount, some or all of the data may be segmented to define a plurality of machine data subsets and/or a plurality of image data subsets.

Figure 7:
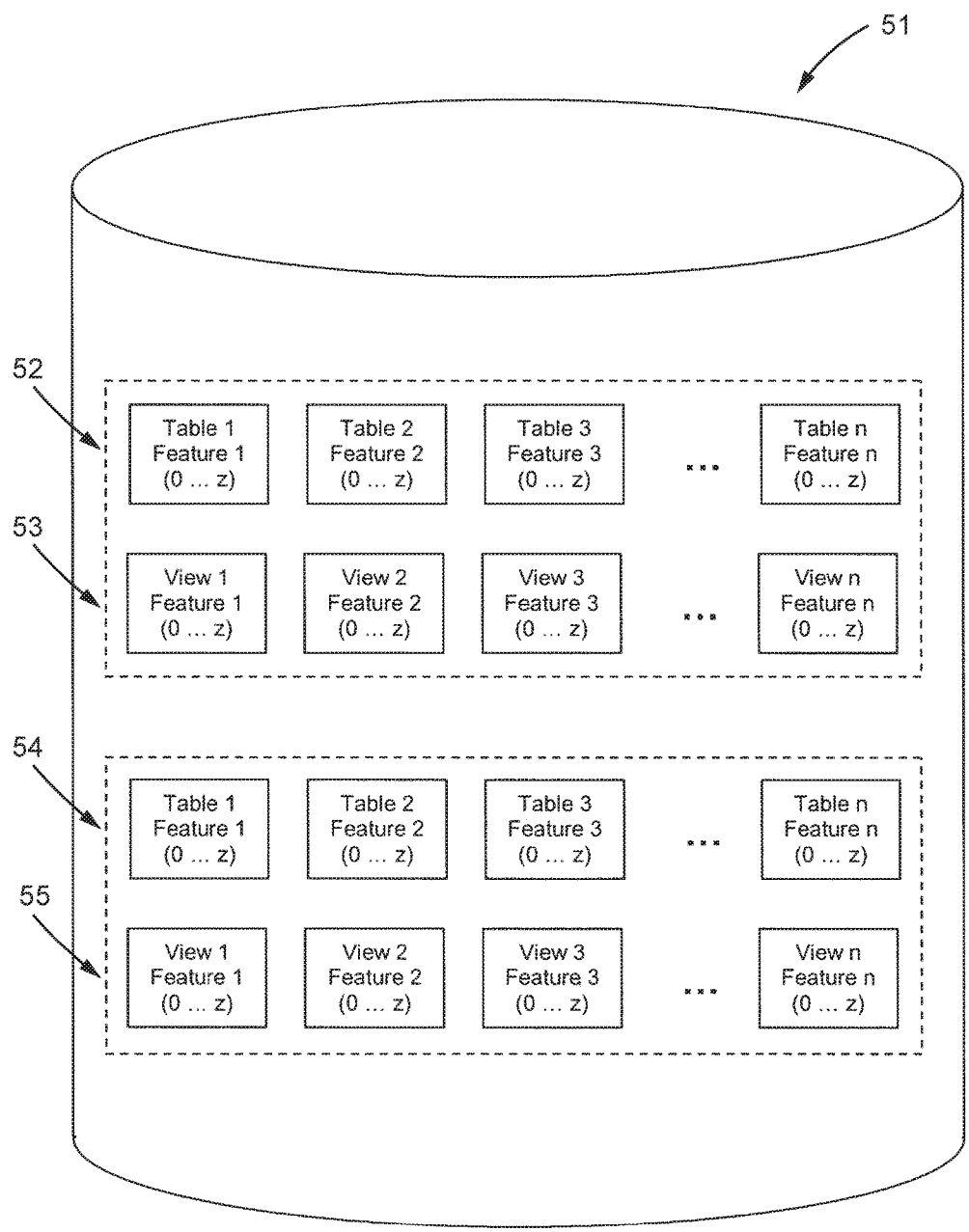
FIG. 7 is a schematic illustration of a data structure in accordance with the disclosure.

As depicted in FIG. 7, the data within the on-board data structure 51 may be stored as a plurality of machine data subsets of the machine data and are depicted as a plurality of tables 52 numbered (1-n) and include a label "Feature" numbered (1-n) and the image data subsets of the absolute image data are depicted as a plurality of views 53 numbered (1-m) and include a label "Feature" numbered (1-m), where the number of tables and the number of views may or may not be identical. In one embodiment, the data subsets may be stored in an LAS format but other formats may be used, and if desired. Other formats, including those that are GIS enabled, may be used if desired.

In order to further reduce the amount of data that is transmitted wirelessly to a location off-board or off-site from the machine 10, the data stored within the on-board data structure 51 may be compressed at stage 72. More specifically, as depicted in FIG. 7, each of the data subsets (i.e., tables 52 and views 53) may be compressed and stored as compressed data subsets (i.e., tables 54 and views 55) that correspond to each of the original or uncompressed data subsets. In one embodiment the compressed data subsets may be stored in a "format x" format. Any type of data compression may be used, if desired. In many instances, it may be desirable to compress the data in a "lossless" manner.

In general, segregation or decimation of the collected data may result in a reduction of data to be transmitted off-board the machine 10 by at least an order of magnitude (i.e., divided by ten). In other words, the data generated by some or all of the on-board sensors may have a first data size and the data segmentation may reduce the amount of data either stored on the machine 10 or to be transmitted to a second data size. In one embodiment, the second data size may be no more than approximately 20 percent of the first data size. In another embodiment, the second data size may be no more than approximately 10 percent of the first data size. In still another embodiment, the second data size may be no more than approximately 5 percent of the first data size.

In addition, compression of the collected data may result in a reduction in the size of the data files to be transmitted off-board the machine 10 by at least another order of magnitude (i.e., divided by ten). Accordingly, the use of the data management system 50 may result in the amount of collected data transmitted off-board the machine 10 being one hundred times less than the amount of collected data or the amount of data received by the various sensors systems on-board the machine.

It should be understood that the actual reductions in size of the data files to be transmitted may depend on a plurality of factors but the operation of the data management system 50 will result in a substantial reduction in the amount of data to be transmitted wirelessly off-board the machine 10 and thus may substantially improve the real time interaction between the machine and other systems remote from the machine.

At decision stage 73, the on-board controller 38 may determine whether the performance of the network is sufficient to transmit the desired data to a remote or off-board system. If the on-board controller 38 determines that the network has not met the desired performance threshold, the on-board controller 38 may buffer or store the data at stage 74 until the performance of the network meets the threshold. Once the performance of the network meets the desired performance threshold, selected data may be transmitted at stage 75 to an off-board system.

Once the desired data has been transmitted off the machine 10 to a remote location, the data may be used in any desired manner. For example, such off-machine systems may include a planning system associated with off-board controller 111 for planning future autonomous movement of machine 10, other machines operating at the work site 100, and any other desired systems. In such example, the transmitted data may be used to update and/or augment the map of the work site 100 at stage 76. In addition, the data may be stored at stage 77, further analyzed, and used for reporting performance of machine 10.

At decision stage 78, the off-board controller 111 may determine whether the transmitted data necessitates or warrants corrective action of the machine 10. If no corrective action is warranted, the machine 10 may continue operating based upon previously generated and/or received instructions and stages 64-78 repeated. If corrective action is warranted, the off-board controller 111 may generate at stage 79 a modified action plan for machine 10. Such modified action plan may be transmitted to machine 10 at stage 80 and stages 64-78 repeated.

As described above, controller 36 may be configured in any manner. In one embodiment, the on-board controller 38 may include a first controller to control the performance of stages 65-71 and a second controller to control the performance of stages 72-77. Such division of operations may be desirable to optimize or improve the performance of each stage based upon the type of data manipulation or operation being performed.

Although described in the context of transmitting data to an off-machine planning system that utilizes the data to plan future autonomous movement of the machine 10, the transmitted data may be used for any desired purpose with any system. In one embodiment, the data may be transmitted to one or more machines operating at the work site 100 that use such data to improve the safety or performance of the operation of those machines. Examples may include the transmitted data providing information regarding the terrain at the work site 100 and confirming the location of obstacles adjacent the machine. In another embodiment, the data may be transmitted to an off-machine planning system that utilizes the data to plan future autonomous movement of other machines operating at the work site 100. An example may include an off-machine planning system that determines, from the transmitted data, a problem with an area at the work site 100 (e.g., it is too wet for the machines to efficiently operate) or that an obstacle has been detected. Based upon this information, the planning system may re-route machines to avoid the perceived problem or obstacle.

As described above, the data management system 50 may be used with any type of machine 10. In another example, the machine 10 may embody a hydraulic excavator (not shown). In addition to performing a material moving operation such as digging, the excavator may be used to move and position conduits such as pipes that are to be laid or positioned about the work site 100. In addition to planning current operations, the data management system 50 may also be useful to create a map of the position of the conduits and/or permit the creation of a digging plan for subsequent material moving operations based upon the sensed or identified positions of the conduits.

INDUSTRIAL APPLICABILITY

The industrial applicability of the system described herein will be readily appreciated from the foregoing discussion. The foregoing discussion is applicable to machines 10 that operate at a work site 100 that generate data that would be useful off-board the machine. The systems and processes disclosed herein may be used at a mining site, a landfill, a quarry, a construction site, a roadwork site, a forest, a farm, or any other area in which it is desired to improve the efficiency of the operation of a machine 10 regardless of whether the machine performs a material moving operation.

Machines 10 may be operated at the work site 100 and data collected by the machine. The data may be segmented into a plurality of data subsets and only some of the data subsets transmitted to a remote or off-board system. The off-board system may use the transmitted data in real time for any desired purpose. In one example, the transmitted data may be used by the off-board system to generate machine movement plans for the machine that generated the data or for another machine.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for communicating between a machine and a remote system, comprising:

an off-board controller associated with the remote system off-board the machine;
a position sensor on-board the machine configured to generate position signals indicative of a pose of the machine, the position sensor interacting with a global positioning system;
a plurality of machine sensors on-board the machine configured to generate machine signals indicative of a plurality of machine characteristics of the machine;
a perception sensor associated with the machine configured to generate raw data points reflective of a perceived work environment associated with the machine; and
an on-board controller configured to:
 determine the pose of the machine based upon the position signals;
 determine a plurality of machine characteristic of the machine based upon the machine signals;
 associate the pose of the machine with the plurality of machine characteristics;
 generate a relative point cloud of the perceived work environment associated with the machine based upon the raw data points;
 determine an absolute point cloud based upon the relative point cloud and the pose of the machine;
 segment the plurality of machine characteristics to define a plurality of machine data subsets;
 segment the absolute point cloud to define a plurality of image data subsets;
 transmit at least some of the plurality of machine data subsets and less than the entire plurality of image data subsets off-board the machine to the off-board controller; and
the off-board controller being configured to:
 store an electronic map of a portion of a work site;
 update the electronic map based upon the less than the entire plurality of image data subsets; and
 generate a machine movement plan based upon the updated electronic map.

2. The system of claim 1, wherein the off-board controller is further configured to transmit the machine movement plan to the machine.

3. The system of claim 1, wherein the off-board controller is further configured to transmit the machine movement plan to a second machine remote from the machine.

4. The system of claim 1, wherein the off-board controller is on a second machine and the machine movement plan is configured to direct movement of the second machine.

5. The system of claim 1, wherein the off-board controller is configured to generate the machine movement plan based further upon the at least some of the plurality of machine data subsets.

6. The system of claim 1, wherein the on-board controller is further configured to segment the plurality of machine characteristics based upon an operation being performed by the machine.

7. The system of claim 1, wherein the on-board controller is further configured to segment the absolute point cloud based upon an operation being performed by the machine.

8. The system of claim 1, wherein the on-board controller is further configured to compress the image data subsets.

9. The system of claim 1, wherein the on-board controller is further configured to compress the plurality of machine data subsets.

10. The system of claim 1, wherein the plurality of machine data subsets are generated based upon an operation being performed by the machine.

11. The system of claim 1, wherein the plurality of image data subsets are generated based upon an operation being performed by the machine.

12. The system of claim 1, wherein the plurality of machine data subsets are generated based upon a location of the machine at the work site.

13. The system of claim 1, wherein the plurality of image data subsets are generated based upon a location of the machine at the work site.

14. The system of claim 1, wherein a first set of machine characteristics are determined while the machine is performing a first operation and a second set of machine characteristics are determined while the machine is performing a second operation.

15. The system of claim 1, wherein a first set of image data subsets are defined while the machine is performing a first operation and a second set of image data subsets are defined while the machine is performing a second operation.

16. The system of claim 1, wherein the on-board controller is further configured to store a plurality of operations to be performed by machine and the plurality of machine characteristics are determined based upon each of the plurality of operations.

17. The system of claim 1, wherein the absolute point cloud has a first data size, the only some of the plurality of image data subsets have a second data size, and the second data size is no more than approximately 10 percent of the first data size.

18. A method of communicating between a machine and a remote system, comprising:
 determining a pose of the machine based upon position signals from a position sensor on-board the machine, the position sensor interacting with a global positioning system;
 determining a plurality of machine characteristic of the machine based upon machine signals from a plurality of machine sensors on-board the machine;
 associating the pose of the machine with the plurality of machine characteristics;
 generating a relative point cloud of a perceived work environment associated with the machine based upon raw data points from a perception sensor associated with the machine;
 determining an absolute point cloud based upon the relative point cloud and the pose of the machine;
 segmenting the plurality of machine characteristics to define a plurality of machine data subsets;
 segmenting the absolute point cloud to define a plurality of image data subsets;
 transmitting at least some of the plurality of machine data subsets and less than the entire plurality of image data subsets off-board the machine to an off-board controller; and
 storing an electronic map of a portion of a work site off-board the machine;
 updating the electronic map based upon the less than the entire plurality of image data subsets; and
 generating off-board the machine a machine movement plan based upon the updated electronic map.

19. The method of claim 18, further including transmitting the machine movement plan to the machine.

20. A system for communicating between a machine and a remote system, comprising:
 an off-board controller associated with the remote system off-board the machine;
 a machine including:

a ground engaging drive mechanism to propel the machine;
a position sensor on-board the machine configured to generate position signals indicative of a pose of the machine, the position sensor interacting with a global positioning system;
a plurality of machine sensors on-board the machine configured to generate machine signals indicative of a plurality of machine characteristics of the machine;
a perception sensor associated with the machine configured to generate raw data points reflective of a perceived work environment associated with the machine; and
an on-board controller configured to:
　determine the pose of the machine based upon the position signals;
　determine a plurality of machine characteristic of the machine based upon the machine signals;
　associate the pose of the machine with the plurality of machine characteristics;
　generate a relative point cloud of the perceived work environment associated with the machine based upon the raw data points;
　determine an absolute point cloud based upon the relative point cloud and the pose of the machine;
　segment the plurality of machine characteristics to define a plurality of machine data subsets;
　segment the absolute point cloud to define a plurality of image data subsets;
　transmit at least some of the plurality of machine data subsets and less than the entire plurality of image data subsets off-board the machine to the off-board controller; and
the off-board controller being configured to:
　store an electronic map of a portion of a work site;
　update the electronic map based upon the less than the entire plurality of image data subsets; and
　generate a machine movement plan based upon the updated electronic map.

* * * * *